Nov. 26, 1957     R. J. MEDKEFF     2,814,487
PNEUMATIC WEB GUIDE

Filed March 4, 1954     3 Sheets—Sheet 1

INVENTOR.
Russell J. Medkeff
BY
Att'ys

Nov. 26, 1957 R. J. MEDKEFF 2,814,487
PNEUMATIC WEB GUIDE
Filed March 4, 1954 3 Sheets-Sheet 2

INVENTOR.
Russell J. Medkeff
BY
Att'ys

Nov. 26, 1957 R. J. MEDKEFF 2,814,487
PNEUMATIC WEB GUIDE
Filed March 4, 1954 3 Sheets-Sheet 3
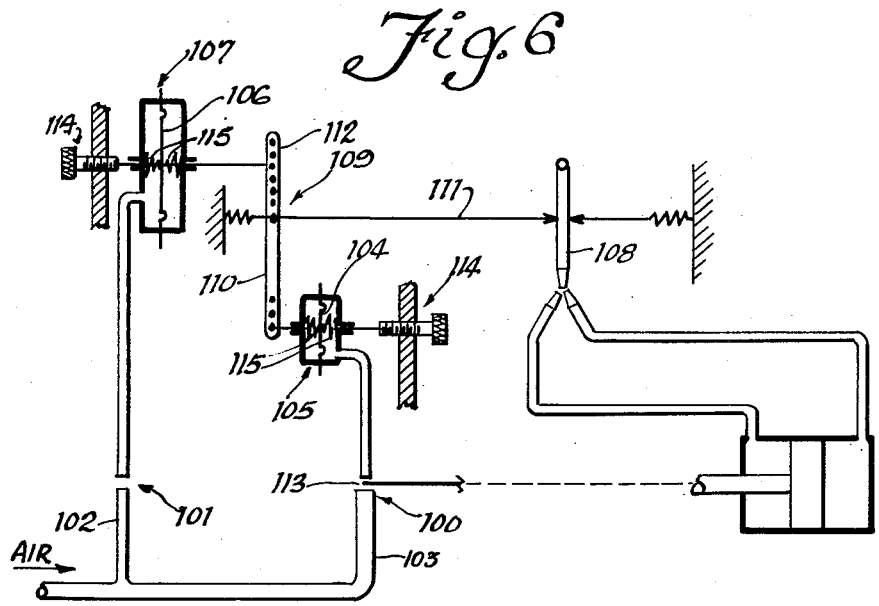
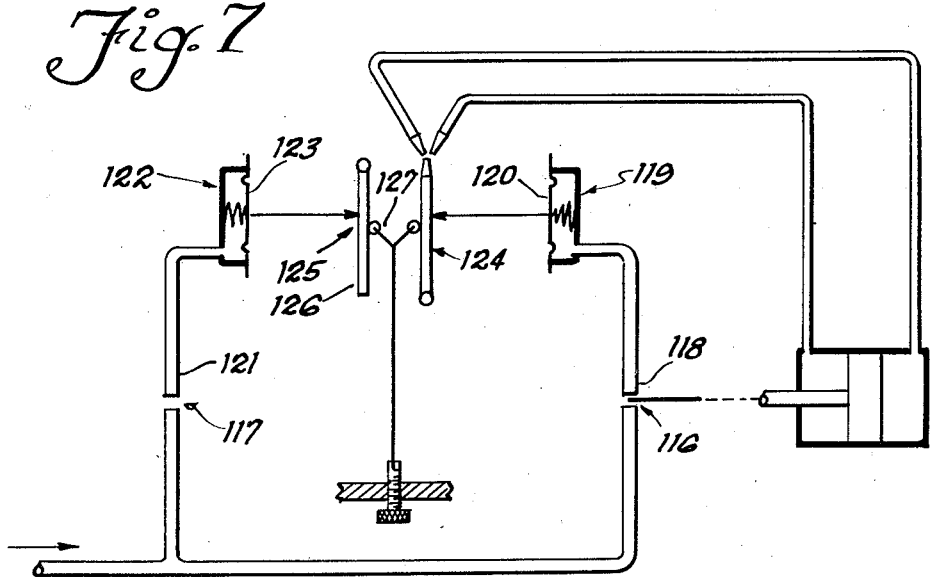
INVENTOR.
Russell J. Medkeff

United States Patent Office 2,814,487
Patented Nov. 26, 1957

2,814,487

PNEUMATIC WEB GUIDE

Russell J. Medkeff, Chicago, Ill., assignor to Askania Regulator Company, Chicago, Ill., a corporation of Illinois Application March 4, 1954, Serial No. 414,036

10 Claims. (Cl. 271—2.6)

The present invention relates to fluid discharge type detectors for developing fluid pressure signals, the magnitudes of which are representative of the positional relation between the detector and the edge of a body, in a situation where the detector and body are relatively movable in directions extended transverse to the edge in question. Furthermore, in such a device, the magnitude of signal pressure varies as the positional relation between the body edge and detector changes, usually increasing in one, and decreasing in the other direction of relative movement.

By the term "fluid discharge type of detector" is meant an edge position detector provided with a discharge orifice to which fluid, as air, other gas, or in some cases a liquid is discharged in a stream or jet across the path of the edge wherein the instant edge position is to be detected, and which detector is arranged to develop a signal pressure the magnitude of which is determined by the portions of the fluid stream intercepted by and passing the body edge. One specific example of such detectors is one wherein the discharge orifice is opposed to and spaced from a receiver port, the body advancing and receding between the orifice and port and thereby determining the percentage of the stream and the kinetic energy thereof that reaches the receiver port, and that is exerted therein to provide the signal pressure. Another such detector is one wherein the signal pressure is developed in a chamber that discharges through the orifice, and wherein the pressure is varied by reaction of the portion of the stream blocked by the relatively movable body, or quite similarly, is determined by the proportions of the orifice area that are blocked and cleared by the body.

It will be obvious from the above, and it is well known in the art, that, in case of variation in the pressure of the fluid delivered to the detector for discharge, a spurious signal variation will occur. One aspect of the invention relates to automatic compensation of variation in pressure of the fluid delivered to a detector of the type in question.

Another aspect of the invention relates to a novel, simple and effective arrangement for selection of an operating point in the signal pressure range of a detector of the kind in question, that is to say, selection of a pressure magnitude, or of a certain positional relation between a body edge and a detector, as a neutral or zero, from which departure serves to operate some responsive mechanism, for example, mechanism to relatively move the detector and body to reestablish the selected positional relation.

In a purely exemplary manner, the specific field of detection of the position of the edge of a traveling web has been selected for disclosure of the invention, and the mechanism operated by the signal pressure output of the detector is shown as mechanism for maintaining the web edge substantially in a preselected path.

In the accompanying drawings:

Fig. 6 is a view similar to Fig. 1, but showing a different system arrangement.

Fig. 7 is a similar view showing a still different arrangement.

Figure 1:
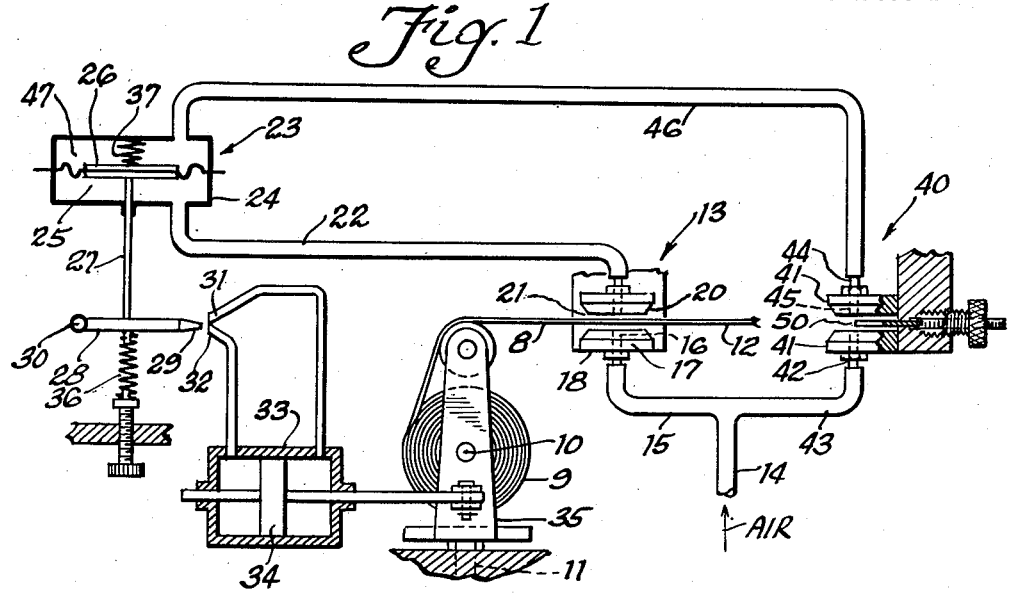
Fig. 1 is a somewhat schematic view, partly in elevation and partly in vertical section, taken laterally of the guided web and showing one embodiment of the invention.
Figure 2:
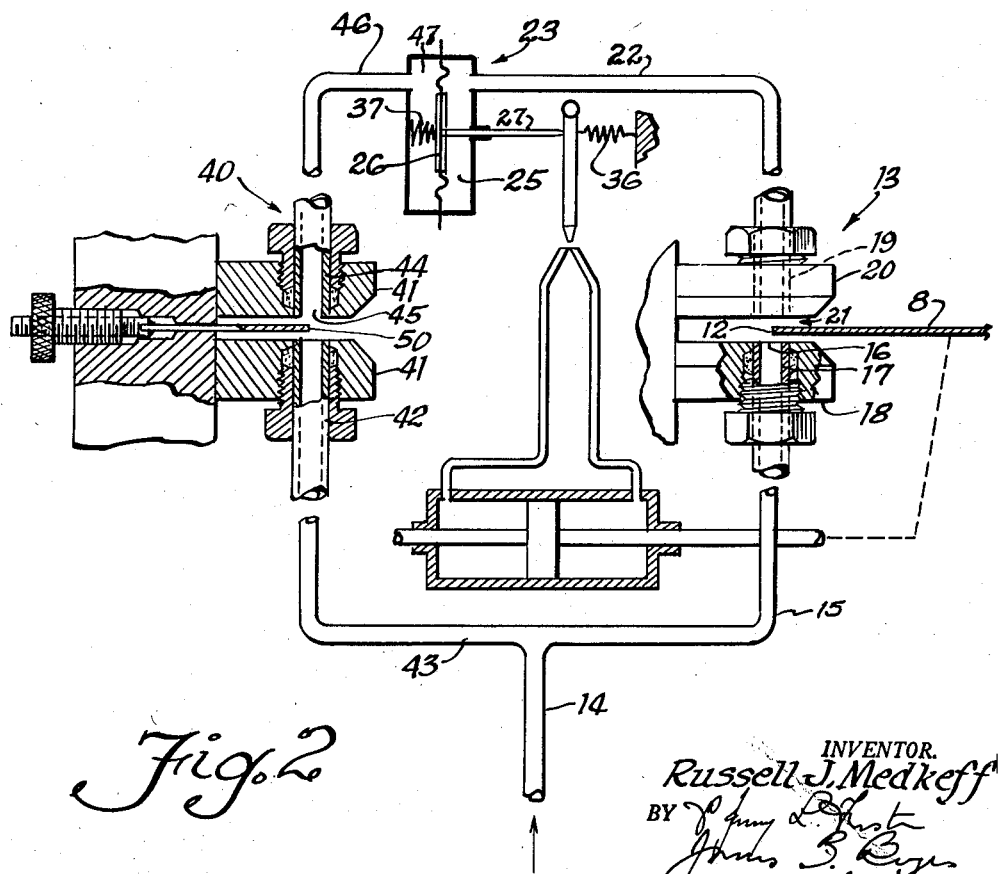
Fig. 2 is a similarly schematic, enlarged transverse view of the assembly of detector, and supply pressure variation compensator and operating point selector.

First describing the system arrangement disclosed by Figs. 1 and 2, it will be assumed that a longitudinally traveling web 8 is being stripped from a rotating supply roll 9, which is mounted for swinging of its axis of rotation 10 about a pivot 11 located midway of the roll length. It is also assumed that the edge 12 (the near edge in Fig. 1 and the left edge in Fig. 2) is to be maintained in a selected path by swinging of roll 9 about pivot 11 to correct lateral displacement of web edge 12 from the selected path.

A conventional web edge position detector 13 is of the fluid discharge type wherein air under pressure is delivered through lines 14, 15 to a discharge orifice 16 of a nozzle 17 carried by support 18 from which it is discharged as a jet or stream toward an opposed open-ended receiver tube 19 carried by a support 20, all of which are spaced from support 18 and nozzle 17 to provide a throat 21 through which travels the marginal portion of web 8 that is adjacent the edge 12 .

A signal pressure tube 22 transmits pressure developed in receiver tube 19 from the air stream, or portion thereof, reaching the open tube end, to apparatus for swinging roll 9 to correct errors in the lateral position of web edge 12. In Figs. 1 and 2 such apparatus is shown as a signal motor 23, having structure 24 partly enclosing an expansible chamber 25 that is partly enclosed also by a movable wall surface, here provided by one side of a flexible diaphragm 26 that is connected to move an output member 27 in response to variations in magnitude of pressure exerted in chamber 25. In the arrangement shown, output member 27 controls a hydraulic relay, the control element of which is a jet pipe 28, supplied with liquid under pressure for discharge from an orifice in its free end 29, and pivoted for swinging about an axis 30, from a neutral position wherein its discharge orifice is in equal registration with a pair of receiver ports 31, 32 in opposite directions, respectively to increase and decrease degree of its registration with one and the other of ports 31, 32 and increasing and decreasing pressures in the respective ends of a power unit cylinder 33. The piston 34 of the power unit is linked to structure 35 that supports roll 9 for swinging about the pivot 11. So much is conventional.

For compensating variations in pressure of air supplied through pipes 14, 15, which variations would result in a variation in magnitude of pressure exerted in chamber 25, a movement of jet pipe 28, which is biased to its neutral position by centering springs 36, 37, and operation of power unit 33, 34 to change the lateral position of web edge 12, an arrangement is provided to oppose to pressure exerted in chamber 25, a compensating pressure that varies with variation in the supply pressure.

In Fig. 1 this compensating means is shown as a device 40 that is similar in arrangement and mode of operation to the web edge position detector 13. This device 40 comprises a pair of supports 41 spaced apart and respectively carrying an nozzle 42, supplied from pipe 14 by a branch pipe 43 and a receiver tube 44 having a port 41 disposed to receive air discharged by nozzle 42. Receiver tube 44 is connected by a pipe line 46 to a second expansible motor chamber 47 that also is partially enclosed by a movable wall surface, here provided by the second side of diaphragm 26, and that in any case is arranged and so connected with the relay control element, jet pipe 28, that variation in pressures in chamber 47, occurring by reason of variation in the pressure of fluid supplied through pipe 14 and 43, is opposed to similar variations in pressure in chamber 25 that arise by reason of the same pressure variations in fluid delivered by supply pipe 14 and pipe 15.

It will be evident that if the stream of air delivered by compensator nozzle 42 to receiver port 43 is of the same cross section as that delivered by the detector nozzle 17, but partially intercepted and blocked from reaching the detector receiver tube 19, pressure variations in the main supply pipe 14 will be reflected by pressure variations in the compensation motor chamber 47 of greater magnitudes than the magnitudes of corresponding variations in chamber 25, and false signal variation and relay operation will result.

Such improper response to supply pressure variations may be avoided in a number of ways, by so arranging the auxiliary or compensating device that the magnitudes of pressure supply variations reflected by the auxiliary motor chamber, in opposition to those reflected in the primary signal motor chamber, or the effects of such pressure variations in the respective motor chambers upon the relay controller element, are made substantially equal. This involves a proportional force-balancing system that serves to render the magnitude of force exerted upon the relay control element by the pressure in the auxiliary motor chamber equal to that exerted thereon by the primary signal, developed by the web edge position detector while the web edge occupies its correct preselected path and positional relation to the detector. Such a proportional force-balancing system provides the additional advantage of permitting the detailed arrangement of the auxiliary or compensating system to differ in size and/or type from the detailed arrangement of the web edge position detector system, since one may be given a mechanical advantage over the other. Conveniently the proportioning system is readily and conveniently adjustable, thereby to perform the additional function of means permitting ready and convenient selection of a particular path to be followed by the web edge, which may be selected to lie at any point within the practical working range of the detector, and which selection may be accomplished without in and out adjustment of the detector, laterally of the web edge path, to make a set zero point of the detector coincide with the selected web edge path.

Referring again to Figs. 1 and 2, it will be seen that the supply pressure variation compensator device 40 is provided with a vane 50 that is adjustably movable between the discharge orifice of nozzle 42 and receiver port 45, thereby to more or less intercept a stream of air delivered by the former toward the latter, thereby to permit selection of the magnitude of pressure developed in the auxiliary motor chamber 47 while the supply pressure in line 14 remains normal. Pressure in auxiliary chamber 47 is directly opposed to that of primary chamber 25 by reason of the exertion of the pressures in the different chambers upon opposite surfaces of the movable wall 26. Therefore equalization of these pressures is necessary to the maintenance of the relay control member, jet pipe 28, in its neutral position by springs 36, 37, and the magnitude of signal pressure developed by detector 13 will unbalance motor 23, operating the web-shifting relay 28, 34, until the web edge 12 arrives at a position wherein the pressures in motor chambers 25, 47 are balanced. Thereafter any variation in supply pressure will be reflected by opposed equal pressure variations in the respective motor chambers, and no relay operation will follow. A change of position of vane 50 will effect a change of pressure in chamber 47, relay operation will result, and web 8 will be shifted to a new position.

Figure 3:
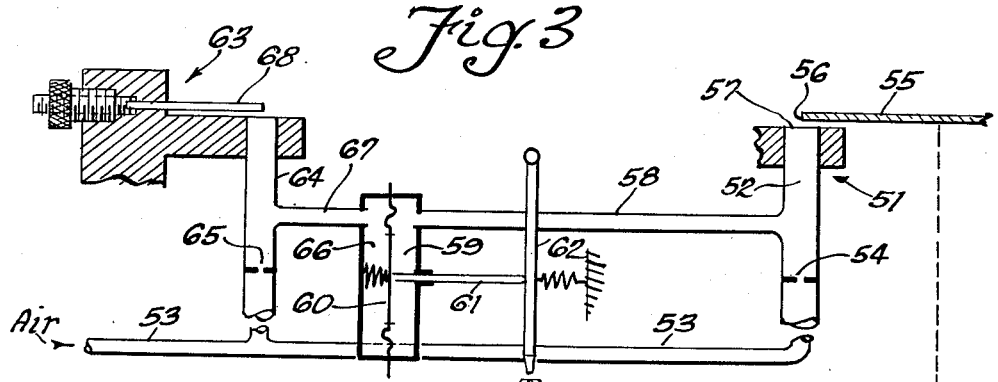
Fig. 3 is a similarly schematic transverse section showing the system with another type of fluid discharge detector.

In the system of Fig. 3 a fluid discharge detector 51 of the second type above referred to is disclosed. Such detector comprises a discharge tube 52 that is supplied with air under pressure from a supply pipe 53 by way of a pressure differential generating orifice structure 54. The marginal portion of web 55 adjacent its detected and guide edge 56 travels over and adjacent a discharge orifice 57 of the end of tube 52, whereby magnitude of pressure within the latter varies with lateral motion of the web. By a signal pipe 58 the interior of tube 52, which constitutes a signal pressure developing chamber, is connected with a primary, signal responsive, expansible motor chamber 59 that is partially enclosed by a movable wall in the form of flexible diaphragm 60, that is connected by a link 51 to a relay control element, again shown as a jet pipe 62.

The compensating device 63 shown in Fig. 3 is similar to detector 51, comprising a discharge tube 64 supplied from pipe 53 through an orifice 65, and having its interior connected to an auxiliary or compensating motor chamber 66 by a line 67. Chamber 66 is partially enclosed by a movable wall surface connected to exert force of pressure in chamber 66 in opposition to that developed by pressure in chamber 59, and, as in Figs. 1 and 2, in Fig. 3 this is accomplished by separating chambers 59, 66 by diaphragm 60.

In Fig. 3, a vane 68 is movable relative to the discharge orifice of tube 64, and serves as a means of equalizing pressure variations in chamber 66, arising from variations in primary motor chamber 59. It also serves as a means of selectively adjusting the path of web edge 56 without movement of detector 51.

Figure 4:
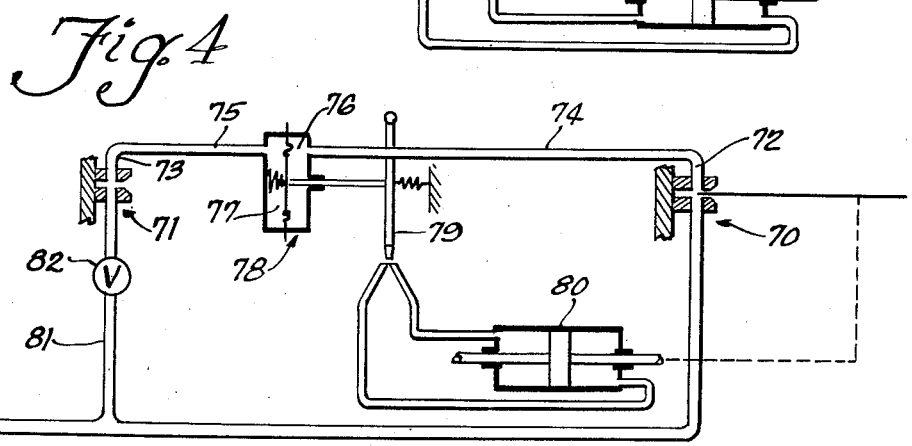
Fig. 4 is a view similar to Fig. 3 showing another modification.
Figure 5:
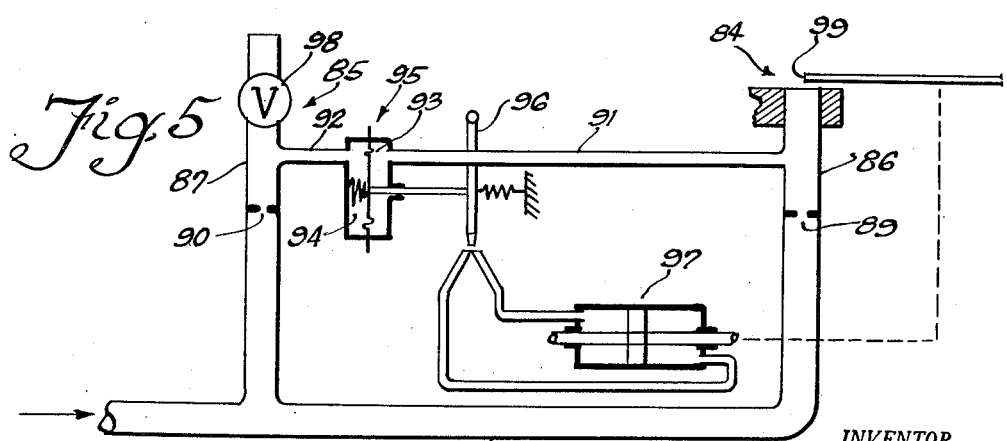
Fig. 5 is a view similar to Fig. 3 showing yet another modification.

Figs. 4 and 5 disclose variations respectively of systems having detectors of the types used in the systems of Figs. 1 and 3, and wherein compensating pressure controlling valves are used instead of vanes, to equalize compensating pressure variations, and to permit selection of the web edge path.

In Fig. 4, web edge position detector 70, and compensating pressure developing device 71 both are of the discharge nozzle and receiver type, and they respectively have pressure-developing receivers 72, 73 connected by lines 74, 75 to the different ones of primary and auxiliary expansible chambers 76, 77 of a signal motor 78 that operates a web-shifting relay 79, 80. Instead of an adjusting vane, as 50 of Figs. 1 and 2, the pressure fluid supply line 81 that delivers fluid to compensator 71 has connected therein a volume flow rate regulating valve 82, adjustment of which serves to selectively regulate the magnitude of pressure developed by the compensating receiver 73, and exerted in compensating motor chamber 77.

In Fig. 5, detector and compensator devices 84, 85 of the type shown in Fig. 3 are used. These respectively have discharge tubes 86, 87 connected with supply pipe 88 by orifices 89, 90, and the interiors of which respectively are connected by pressure lines 91, 92 to different expansible chambers 93, 94 of a motor 95 connected to operate web-shifting relay 96, 97. Instead of an adjustable vane, as 68 of Fig. 3, in Fig. 5, a valve 98 is arranged to adjustably regulate the volume rate of fluid discharge from the compensator device discharge tube 87, thereby to permit selection of magnitude of pressure developed thereby and exerted in motor chamber 94 in opposition to the signal pressure exerted in chamber 93. Valve 98 thereby permits selection of the path of web edge 99, and also serves to equalize magnitudes of variation of pressure exerted in chamber 94, resulting from variation of pressure in fluid delivered by supply line 88, to magnitudes of corresponding variations in chamber 93, arising from the same supply pressure variations.

Similar results can be accomplished by arranging the compensator to develop a single pressure during supply of fluid at normal pressure, and such compensating pressure may be of different magnitude from that developed by the web edge detector while the web edge is in its proper path, if a suitable compensating force advantage is arranged in the linkage that transfers to the relay control element the forces exerted by the different pressures. Furthermore, an arrangement providing for such an advantage may be made adjustable to provide advantages of adjustment and equalization of effects on the relay controller of corresponding signal and compensating pressure variations arising from the same supply pressure variations. Figs. 6 and 7 disclose two such systems.

In Fig. 6 the detector 100 and the compensator 101 both are shown as of the air nozzle and receiver type. However, the supply line 102 to the compensator is shown as having a much smaller cross section than the supply line 103 to the detector, and compensator 101 therefore develops a smaller pressure, and smaller supply pressure variations than does detector 100. This discrepancy of pressure magnitudes may be compensated by various more or less equivalent expedients, of which three are shown in Fig. 6, and such expedients may be used singly or together. For example, to compensate the difference in magnitudes of pressures normally developed by detector 100 and compensator 101, the movable wall 104 of the primary signal motor chamber 105, upon which the pressure developed by detector 100 is exerted, may be of smaller area than the movable wall 106 of the compensator motor 107. To oppose forces developed by the pressures exerted upon walls 104, 106, and apply the resultant to a relay control element, as jet pipe 108, a mechanical summarizer 109 of conventional whiffletree arrangement may be employed. Such summarizer comprises a floating lever 110 having its respective arms linked to walls 104, and 106 in such relation that pressures exerted on those walls tend to move the arms in opposite directions, and an intermediate point of lever 110 is pivoted to link 111 that transfers a summary of the positions of walls 104, 106 to jet pipe 108. As indicated at 112, lever 110 may be provided with alternative connections, so that the effective lengths of the magnitude of force exerted by auxiliary motor wall 106 that will balance the greater, corresponding force exerted by primary signal motor wall 104, and consequently permitting a selection of a particular path in which web edge 113 is to be guided. Similarly, adjustment may be provided by manually settable devices 114 for selecting the degree of tensing the diaphragm centering spring systems 115.

Fig. 7 discloses still another type of adjustment for selecting a particular web edge path, and also equalizing primary signal and compensating pressure variations that reflect the same variations in supply pressure. In this arrangement, the detector 116 and the compensator 117 are assumed to be of identical construction and arrangement, and supplied with air at equal volume rates. The receiver 118 of detector 116 is connected to operate a primary signal motor 119 having a movable wall 120, and the receiver 121 of compensator 117 is connected to operate an auxiliary motor 122, having a movable wall 123 opposed to wall 120, and with the relay control element 124 spaced between them. A conventional ratio regulator assembly 125 is interposed between the control element and one of the motor walls, here auxiliary motor wall 123. This regulator comprises a lever 126 arranged alongside element 124 for swinging about an axis parallel to and displaced from the swing axis of element 124, both laterally and longitudinally of the latter element. A motion transferring link 127 is interposed between element 124 and lever 126, and is movable along their lengths, to permit selection of the ratio of forces exerted respectively by walls 120, 123 that will maintain element 124 in its neutral position. Thus, by adjusting the position of link 127 along the lengths of members 124, 126, the path in which web edge 129 is to be guided, may readily be selected. Additionally, while the web edge is in this path, any variation in pressure of fluid supplied to detector 116 and compensator 117 will be reflected by equal changes of forces applied oppositely to element 124, and no motion of the latter will result.

It will be readily appreciated that many variations from and modifications of the exemplary specific disclosures herein made, may be resorted to within the scope of the invention as defined by the appended claims.

I claim:

1. In a system for detecting the positional relation between a detector device and a body that are relatively movable and wherein said detector device comprises a supply line for delivery of fluid under pressure and an orifice connected to said supply line for discharging fluid thereby delivered toward the path of relative lateral movement of an edge of said body for development of a signal pressure the magnitude of which is variable as a function of distance of relative movement between said body and detector, and said system including a motor for converting magnitude of said pressure to a mechanical signal and having an expansible chamber partially enclosed by a movable wall surface and connected with said detector device for exertion of pressure developed by the latter within said chamber; means for compensating variation in pressure of fluid delivered by said supply line, comprising a fluid discharge device having an opening connected with said supply line and arranged for discharge of fluid at a volume rate that is a function of the pressure at which fluid is delivered through said supply line; and for development of a compensating pressure of magnitude dependent solely upon variation in pressure of fluid delivered by said supply line, structure including a second expansible motor chamber connected with said discharge device for exertion therein of compensating pressure developed by the latter, and means mechanically connecting said wall surfaces for opposition of pressures exerted thereon in the different said chambers.

2. In a system for detecting the position of the edge of a body that is movable laterally of said edge and that includes a detector including structure enclosing a flow line for connection to a source of fluid under pressure, an orifice for directing a stream of fluid delivered through said line across the path of a body edge the position of which is to be detected, for interception to a degree determined by the position of said edge, and an enclosed signal pressure chamber arranged relative to said orifice for developing a pressure the magnitude of which corresponds to such degree of interception, and said system including an expansible motor having a chamber partially enclosed by a movable wall surface and connected with said signal pressure chamber; means for compensating effect on signal pressure of variation in pressure of fluid delivered by said supply line, comprising structure enclosing a second pressure chamber connected with said supply line and have a discharge orifice isolated from influence by said body, and a second expansible motor chamber connected with said second pressure chamber and partially enclosed by a second movable wall surface mechanically connected with the first said movable wall surface for opposition of forces exerted by pressures in the different said motor chambers.

3. In a system for detecting the lateral position of an edge of a body, and that includes a detector comprising structure that encloses a flow path including a supply line for connection to a source of fluid under pressure, and a signal pressure chamber, said structure being provided with a first orifice interposed between said supply line and signal pressure chamber and a second orifice between said signal pressure chamber and an exhaust region and said structure providing a path for the edge of a body the position of which is to be detected, adjacent one of said orifices and toward which orifice is directed, for interception of said stream to a degree determined by said edge position, thereby to develop in said chamber a signal pressure that varies as a function of distance of change of said position, and said system including a motor having an expansible chamber connected with said signal pressure chamber and partially enclosed by a movable wall surface; means for compensating the effect on force exerted against said movable wall surface of variation in pressure of fluid delivered through said supply line, comprising a standard signal-developing system including a branch line connected with said supply line to the opposite side of the first said orifice from said signal pressure chamber and provided with a discharge orifice that is isolated from influence by said body and a pressure developing chamber, and a second motor chamber connected with said branch line to the opposite side of the discharge orifice from the supply line, and a second movable wall surface partly enclosing said second motor chamber and connected with said first wall surface for opposition of forces exerted on said surfaces by pressures in the different said chambers.

4. In a system for detecting the position of the edge of a body that is movable in directions extended transverse to said edge and including a detector comprising jet-delivery and receiver members spaced apart to provide clearance for a body the position of an edge of which is to be detected, said jet-delivery member enclosing a supply passage and having a discharge orifice for directing a stream of fluid across the space between said members, and said receiver member being provided with a port for receiving fluid delivered by said orifice and passing said body edge, and said system including a motor having an expansible chamber partially enclosed by a movable wall surface and connected with said port; structure enclosing a branch line connected with said supply passage and having an exhaust orifice for discharge of fluid at a volume rate that is determined solely by the pressure of fluid delivered through said supply line, and structure enclosing a second motor chamber connected with said branch line between said exhaust orifice and supply line, said structure including a second movable wall surface partially enclosing said second motor chamber and mechanically connected with said first movable wall surface for opposition of forces exerted by pressures in the different said chambers.

5. The combination with apparatus for maintaining an edge of a traveling web substantially in a selected path, and including means for laterally adjusting the position of the web, detector means disposed for cooperation with said web edge and arranged for developing a fluid pressure corresponding in magnitude to the position of the web edge and varying as a function of its lateral movement, said detector including a supply line for connection to a source of fluid under pressure, and having an orifice connected with said supply line for discharging fluid toward and past the web edge to develop said pressure, and mechanism for operating said web position-adjusting means in response to variation of said pressure from a magnitude representative of a required web edge path to restore said pressure magnitude through lateral movement of the web relative to said orifice, said mechanism including a motor having an expansible chamber connected with said detector for exertion in the former of pressure developed by the latter, and a movable wall surface partially enclosing said chamber and movement of which actuates said web position-adjusting means; of structure enclosing a fluid flow line connected with said supply line and having an orifice for discharging fluid at a rate determined only by the effective cross sectional area of the discharge path provided by said fluid flow line and the latter said orifice and the pressure of fluid delivered by said supply line, means for developing a compensating pressure of a magnitude that is a function of the pressure of fluid delivered by said supply line, and structure enclosing a second expansible motor chamber connected with said compensating pressure-developing means for exertion therein of pressure developed by the latter, said structure including a second movable wall surface partially enclosing said second chamber and mechanically connected with the first said wall surface for opposition of forces exerted on said wall surfaces by pressures acting in the different said chambers.

6. The combination of claim 5, including means for selectively adjusting the effective cross sectional area of the discharge path provided by said branch line and second orifice.

7. The combination of claim 5, wherein said detector comprises a discharge nozzle provided with the first said orifice and a receiver port opposed thereto, to the opposite side of the web edge path therefrom and to which the first said motor chamber is connected, and wherein said compensating pressure-developing means includes structure provided with a second receiver port opposed to said second orifice and to which said second motor chamber is connected.

8. The combination of claim 5, including a discharge-intercepting vane mounted for manual adjustment relative to said second orifice for varying the effective cross sectional area of said discharge path.

9. The combination of claim 5, wherein said detector comprises a discharge nozzle provided with the first said orifice, and a receiver port opposed thereto, to the opposite side of the web edge path therefrom and to which the first said motor chamber is connected, wherein said compensating pressure-developing means includes structure provided with a second receiver port opposed to said second orifice and to which said second motor chamber is connected, and including means for varying the volume rate of flow from said second orifice to said second receiver port.

10. The combination of claim 5, wherein said detector comprises a discharge nozzle provided with the first said orifice, and a receiver port opposed thereto, to the opposite side of the web edge path therefrom and to which the first said motor chamber is connected, wherein said compensating pressure-developing means includes structure provided with a second receiver port opposed to said second orifice and to which said second motor chamber is connected, and including a vane mounted for manual adjustment into and out of the path of fluid flow from said second orifice to said second receiver port.

References Cited in the file of this patent

UNITED STATES PATENTS

| | | |
|---|---|---|
| 1,858,436 | Dickhaut | May 17, 1932 |
| 2,104,627 | Von Manteuffel | Jan. 4, 1938 |
| 2,303,533 | Ferm | Dec. 1, 1942 |
| 2,539,131 | Gunderson et al. | Jan. 23, 1951 |
| 2,552,189 | Kuehni | May 8, 1951 |
| 2,641,416 | McCleary et al. | June 9, 1953 |